(12) United States Patent
Hsieh et al.

(10) Patent No.: US 7,688,336 B2
(45) Date of Patent: Mar. 30, 2010

(54) METHOD OF RECORDING A PLURALITY OF GRAPHIC OBJECTS AND PROCESSING APPARATUS THEREOF

(75) Inventors: Ming-Jane Hsieh, Taipei (TW);
Zou-Ping Chen, Tai-Chung (TW);
Ming-Chun Chang, Chia-I (TW);
Cheng-Shun Liao, Chang-Hua Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 370 days.

(21) Appl. No.: 11/308,121

(22) Filed: Mar. 7, 2006

(65) Prior Publication Data
US 2006/0288287 A1    Dec. 21, 2006

(30) Foreign Application Priority Data
Mar. 8, 2005    (TW) ............................... 94106945 A

(51) Int. Cl.
| G09G 5/00 | (2006.01) |
| G09G 5/02 | (2006.01) |
| G06T 1/60 | (2006.01) |
| G06F 15/167 | (2006.01) |
| G06F 3/00 | (2006.01) |

(52) U.S. Cl. ........................ 345/619; 345/530; 345/541; 345/592; 715/810; 715/821

(58) Field of Classification Search ................ 715/765, 715/807, 810, 815, 825, 821–824; 345/418, 345/619, 530, 547, 541, 592
See application file for complete search history.

(56) References Cited

U.S. PATENT DOCUMENTS

| 5,729,704 | A | * | 3/1998 | Stone et al. .................. 345/619 |
| 6,097,384 | A | * | 8/2000 | Alecci et al. ................. 715/807 |
| 6,288,720 | B1 | * | 9/2001 | Zimmerman et al. ........ 715/810 |
| 7,126,609 | B1 | * | 10/2006 | Asente et al. ................ 345/619 |
| 7,339,597 | B1 | * | 3/2008 | Bourdev et al. .............. 345/619 |
| 2003/0007011 | A1 | * | 1/2003 | Zimmerman et al. ........ 345/810 |
| 2005/0091596 | A1 | * | 4/2005 | Anthony et al. .............. 715/810 |
| 2006/0090130 | A1 | * | 4/2006 | Bent et al. .................... 715/765 |
| 2006/0212825 | A1 | * | 9/2006 | Taylor et al. ................. 715/788 |
| 2007/0008302 | A1 | * | 1/2007 | Uchida et al. ................ 345/173 |
| 2007/0085860 | A1 | * | 4/2007 | Schmitt ....................... 345/592 |
| 2007/0285440 | A1 | * | 12/2007 | MacInnis et al. ............ 345/619 |

* cited by examiner

*Primary Examiner*—Chante Harrison
(74) *Attorney, Agent, or Firm*—Thomas, Kayden, Horstemeyer & Risley

(57) ABSTRACT

A method for recording a plurality of graphic objects is disclosed. Each graphic object includes at least one common parameter and at least one object data. The method includes recording the at least one common parameter corresponding to the plurality of graphic objects in a common parameter section; and respectively recording the at least one object data of the plurality of graphic objects in corresponding object sections; wherein the at least one common parameter and the at least one object data are utilized to describe characteristics of the graphic objects.

23 Claims, 5 Drawing Sheets

US 7,688,336 B2

METHOD OF RECORDING A PLURALITY OF GRAPHIC OBJECTS AND PROCESSING APPARATUS THEREOF

BACKGROUND OF THE INVENTION

1. Field of the Invention

The present invention relates to image processing techniques, and more particularly, to methods for recording a plurality of graphic objects and processing apparatus thereof.

2. Description of the Prior Art

Digital televisions are becoming increasingly more popular as conventional analog video broadcasting is transforming into digital video broadcasting (DVB). Digital televisions often manage those frequently accessed graphic data utilizing object-oriented techniques, and store these data in the memory of the digital television. The object-oriented techniques are adopted to provide more flexible displaying functions for digital televisions. The conventional digital television improves the usage flexibility of the graphic objects by configuring an independent data structure for each individual graphic object. Unfortunately, when the contents or parameters of those graphic objects require some configuration or modification the programmer must make the changes to each individual graphic object's data structure. Obviously, the conventional object-oriented graphic description method increases the workload of the programmer, increases the complexity of the object-oriented data structures, increases the programming complexity, and requires significant memory space. Consequently, the manufacturing costs of the digital televisions increase.

SUMMARY OF THE INVENTION

It is therefore an objective of the claimed invention to provide methods for processing a plurality of graphic objects in an effort to reduce the programmer's workload and the complexity of programming the digital televisions.

According to an exemplary embodiment, a method for recording a plurality of graphic objects is disclosed. Each graphic object has at least one common parameter and at least one object data, the method comprises: recording the at least one common parameter corresponding to the plurality of graphic objects in a common parameter section; and respectively recording the at least one object data of the plurality of graphic objects in the corresponding object sections; wherein the at least one common parameter and the at least one object data of each graphic object are utilized to describe characteristics of the graphic object.

According to an exemplary embodiment, an image processing device for processing a plurality of graphic objects is disclosed. Each graphic object has at least one common parameter and at least one object data, the image processing device comprises: a common parameter section for storing the at least one common parameter corresponding to the graphic objects; an object section for storing the at least one object data of respective graphic objects; a data processing unit coupled to the common parameter section and the object section for accessing and processing the at least one common parameter and the at least one object data; and a control unit coupled to the data processing unit for adjusting characteristics of the graphic objects according to the at least one common parameter, the at least one object data, or both.

These and other objectives of the present invention will no doubt become obvious to those of ordinary skill in the art after reading the following detailed description of the preferred embodiment that is illustrated in the various figures and drawings.

DETAILED DESCRIPTION

The image processing techniques of the present invention can be applied in various digital televisions, set-top boxes, or other graphic processing circuitry. For convenient descriptions, a digital television is utilized as an example to elaborate the image processing method of the present invention.

Figure 1:
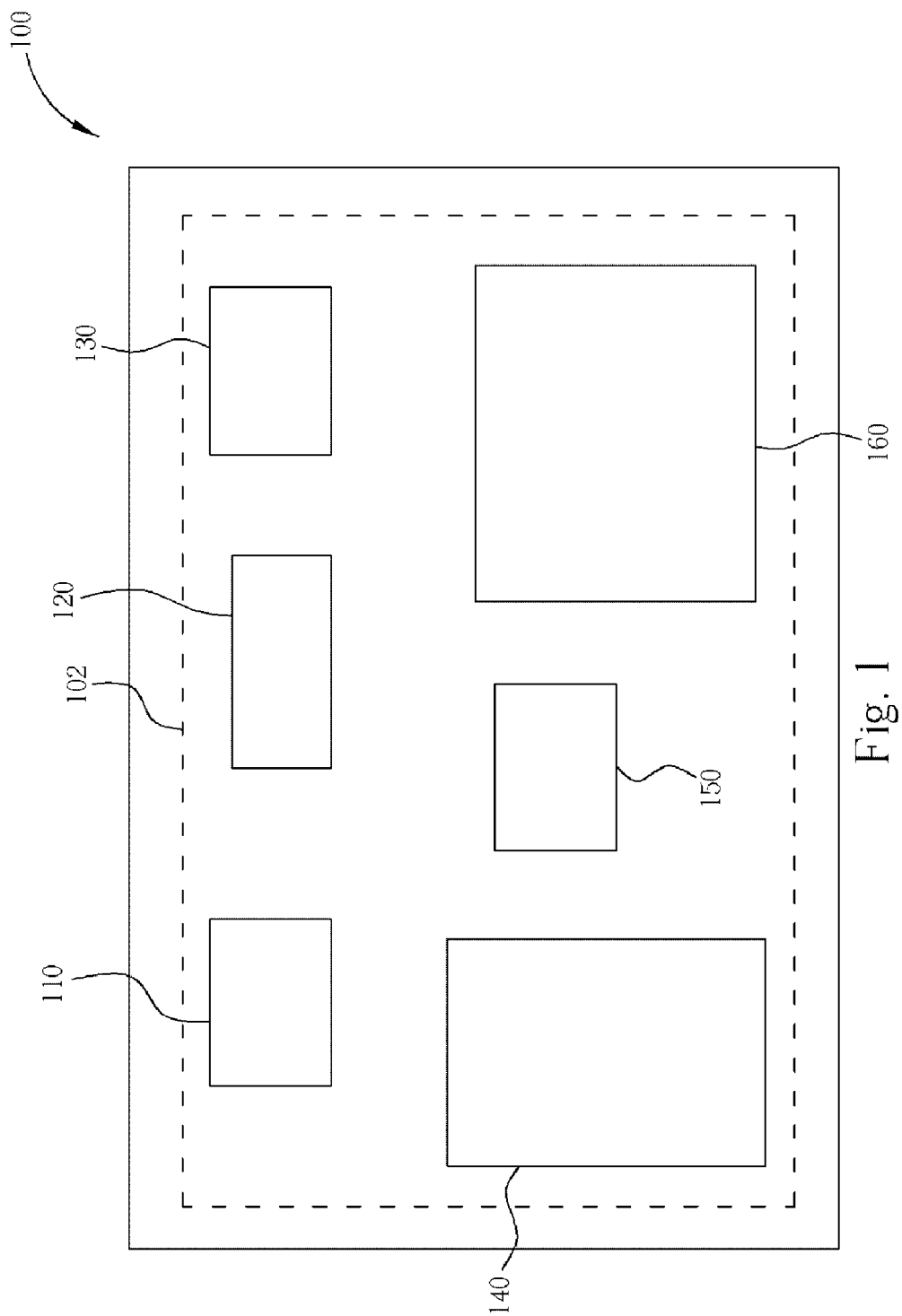
FIG. 1 is an illustration of a picture displayed by a digital television according to a first embodiment of the present invention.

FIG. 1 shows an illustration of a picture 100 displayed by a digital television according to a first embodiment of the present invention. Six graphic objects 110, 120 through 160 are utilized as examples to represent the graphic objects superimposed on the picture 100 when the user presses the control buttons of the digital television or a remote control. For example, the above six graphic objects may represent the graphic objects of an on screen display (OSD). The dotted region within the picture 100 is a virtual section 102 defined by the present embodiment, rather than a graphic object. Specifically, the virtual section 102 is a data structure concept for grouping the above graphic objects. In practice, depending on the design requirement, the size of the virtual section 102 can change to even cover the entire picture 100.

Considering the foregoing descriptions, when the six graphic objects each employ different object data structures the programmer's workload and the complexity of programming the digital television increase as well as memory space requirements. Therefore, the image processing method of the present invention purposefully records the six graphic objects 110 through 160 in a specifically designed graphic data section of a memory in the digital television. As a result, those graphic objects can share common parameters with each other thereby reducing the required memory space.

Figure 2:
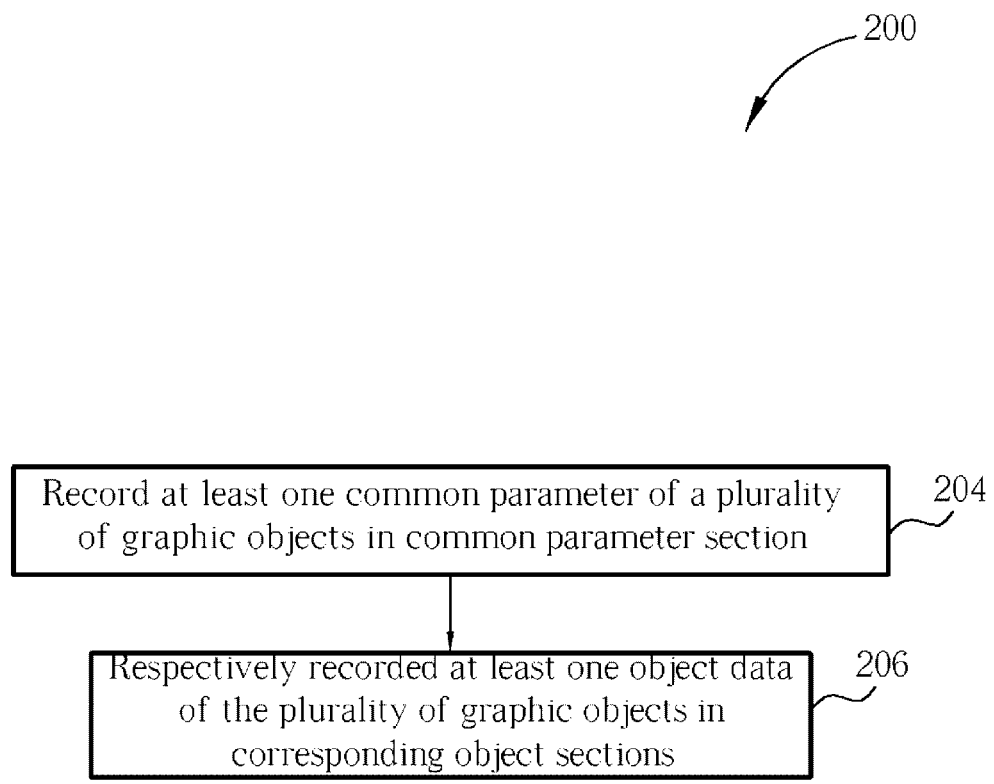
FIG. 2 is a flowchart illustrating a method for recording a plurality of graphic objects of FIG. 1 in a memory according to one embodiment of the present invention.
Figure 3:
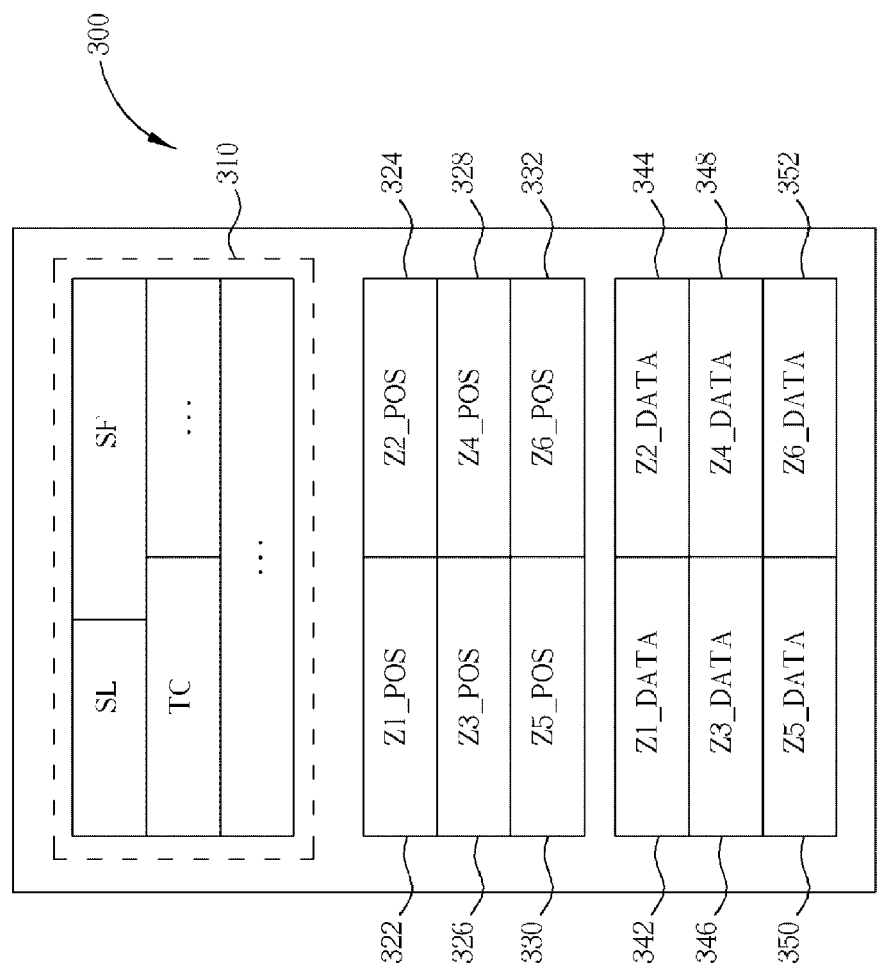
FIG. 3 is a data structure describing a graphic data section stored in memory for recording the plurality of graphic objects of FIG. 1 according to one embodiment of the present invention.

Please refer to FIG. 2 and FIG. 3. FIG. 2 shows a flowchart 200 illustrating a method for recording the plurality of graphic objects of the virtual section 102 in a memory according to one embodiment of the present invention. FIG. 3 depicts a data structure describing a graphic data section 300 stored in memory for recording the plurality of graphic objects of the virtual section 102 according to one embodiment of the present invention.

As shown in FIG. 3, the graphic data section 300 comprises a common parameter section 310, six position sections 322~332, and six data sections 342~352. In step 204, at least one common parameter of the six graphic objects of the virtual section 102 is recorded in the common parameter section 310. In practice, the common parameters of the six graphic objects 110~160 vary with system design or functionalities to be supported. For example, in one embodiment of the present invention, the six graphic objects of the virtual section 102 are all situated in the same layer level and share some common properties such as the same data format, transparency color setting, etc. Thus, in step 204, those common parameters such as the layer level, the data format, and the transparency color setting are respectively recorded in a field SL, a field SF, and a field TC of the common parameter section 310.

Typically, the six graphic objects further include some respective additional object data, in addition to their common parameters. In step 206, at least one object data of each of the six graphic objects, not including the common parameters, is recorded in other sections of the graphic data section 300. In this embodiment, the allocated positions of the six graphic objects are respectively recorded in position section 322~332. Pixel data of the six graphic objects are respectively recorded in data section 342~352. For example, the position settings of the graphic object 110, Z1_POS, is recorded in the position section 322 and the pixel data of the graphic object 110, Z1_DATA, is recorded in the data section 342. The position settings of the graphic object 120, Z2_POS, is recorded in the position section 324 and the pixel data of the graphic object 120, Z2_DATA, is recorded in the data section 344, and so forth.

As mentioned above, the virtual section 102's graphic objects can share the common parameters recorded in the common parameter section 310. The benefits include: the total memory space required for recording all of the graphic objects of the virtual section 102 is thereby reduced; the total saved memory space increases as the number of graphic objects within the virtual section 102 increases; the total saved memory space increases as the number of common parameters of those graphic objects increases.

Figure 4:
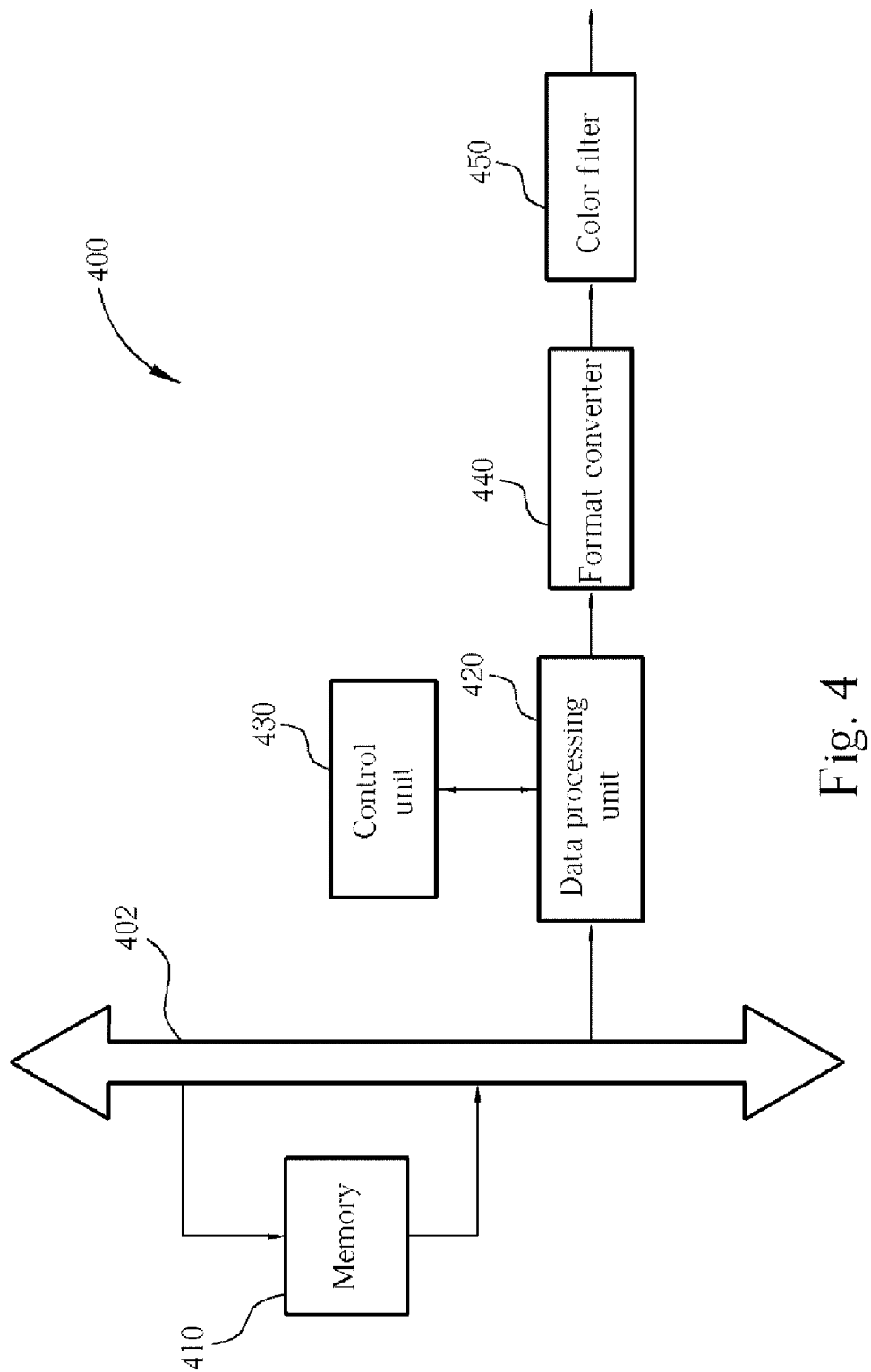
FIG. 4 is a block diagram of an image processing device according to one embodiment of the present invention.

FIG. 4 shows a block diagram of an image processing device 400 according to one embodiment of the present invention. The image processing device 400 is utilized for processing the data of the plurality of graphic objects recorded conforming to the data structure of the graphic data section 300. As shown in FIG. 4, the image processing device 400 comprises a BUS 402, a memory 410, a data processing unit 420, a control unit 430, a format converter 440, and a color filter 450.

The memory 410 is arranged for storing the graphic data section 300 and can be a system memory of the digital television. The data processing unit 420 accesses and analyzes the graphic data section 300 stored in the memory 410 via the BUS 402. The control unit 430 adjusts characteristics of the graphic objects that have been temporarily stored in the data processing unit 420 according to data or parameters recorded in the common parameter section 310 of the graphic data section 300 and other object sections (i.e., the six position sections and the six data sections). For example, the control unit 430 may adjust, for each graphic object, as to whether an object is displayed or not, the object's speed or direction of the scrolling effect, etc. according to the content of the graphic data section 300. Then, the format converter 440 converts the adjusted graphic object's data format into a data format that can be processed by following stages such as the ARGB format. The color filter 450 is arranged for, according to the transparency color setting recorded in the graphic data section 300, adjusting the transparency of a specific color from each of the graphic objects as required by said setting. Often in the digital television, in accordance with the present invention, a mixer/blender (not shown) is also arranged following the image processing device 400. The mixer/blender is utilized for mixing the processed graphic objects from the image processing device 400 with other image data or subtitle data. The result is outputted to components such as a display panel, video output ports, or video output terminals of the digital television.

Please note, that the number or size of the virtual section or number of graphic objects within each virtual section are not limited to those described in the embodiment shown in FIG. 1, and are all alterable depending on the needs. In addition, the common parameter section 310 and other object sections (e.g., the position sections 322~332 and the data sections 342~352) of the graphic data section 300 corresponding to the virtual section 102 may be respectively stored in various storage medium, and are not limited to be stored in a single storage medium as described in the above-mentioned embodiment.

Figure 5:
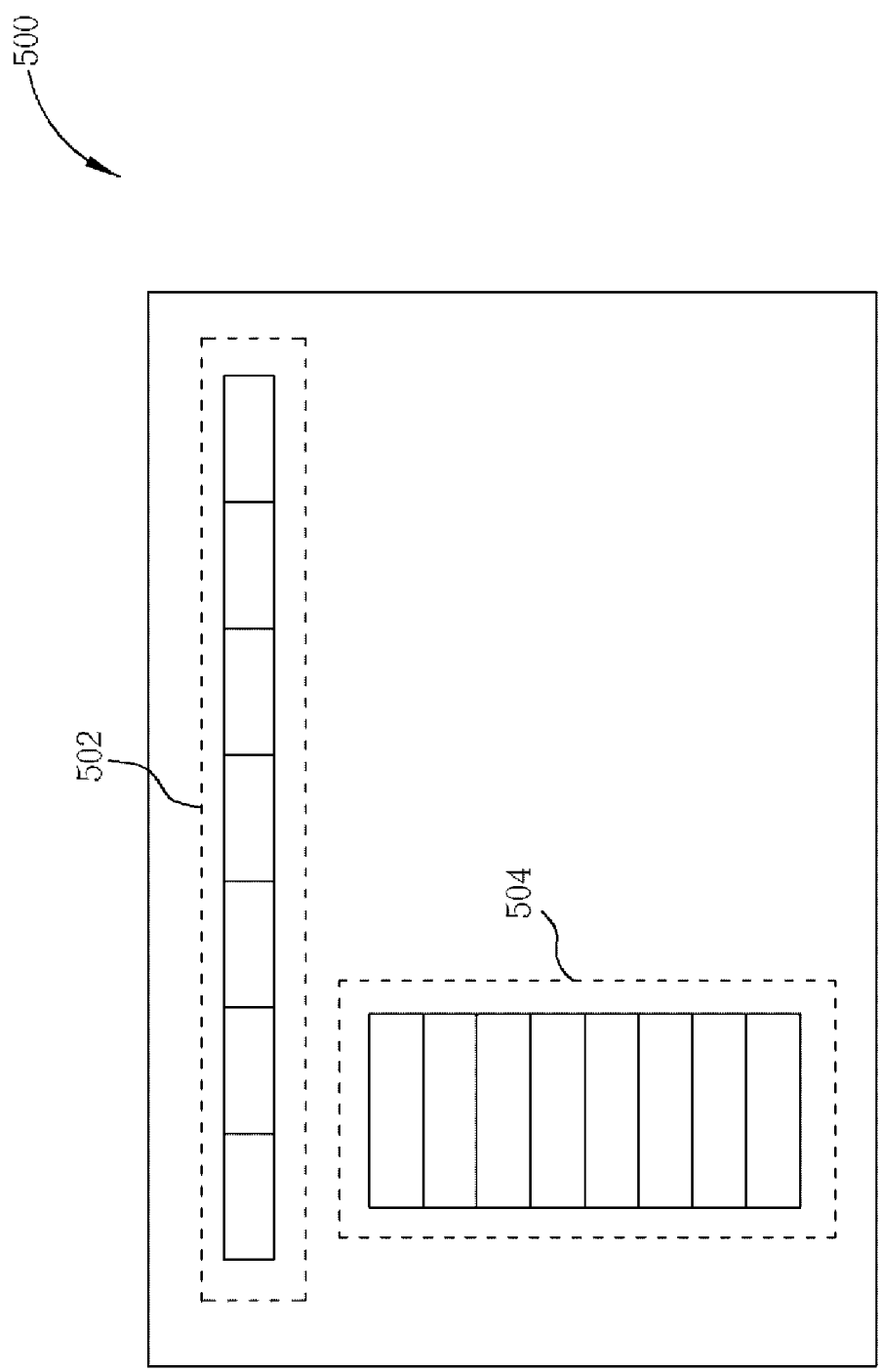
FIG. 5 is an illustration of a picture displayed by a digital television according to a second embodiment of the present invention.

Thereto, a plurality of graphic objects to be displayed in a single picture may be presented in a menu-like arrangement as shown in FIG. 5. In a picture 500 shown in FIG. 5, two virtual sections 502 and 504 are defined to describe different graphic object groups in the menu-like format, respectively. In this embodiment, the graphic objects of the same virtual section have the same height setting, the same width setting, or even the same background color. According to the graphic object description method disclosed above, those common height setting, width setting, or background color setting can also be recorded in the common parameter section of a graphic data section corresponding to the virtual section, therefore reducing the required memory space.

Considering the foregoing descriptions, it is obvious that the memory space required for recording the data and parameters of the plurality of graphic objects is significantly reduced by utilizing the virtual section concept. Additionally, the complexities of programming and circuitry control are reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for recording a plurality of graphic objects, each graphic object having at least one common parameter and at least one object data, the method comprising:

recording in a memory the at least one common parameter corresponding to the plurality of graphic objects in a common parameter section, wherein the at least one common parameter comprises a transparency color setting and a data format relating to a color model, both corresponding to the graphics objects; and respectively recording the at least one object data of the plurality of graphic objects in corresponding object sections;

wherein the at least one common parameter and the at least one object data of each graphic object are utilized to describe characteristics of the graphic object.

2. The method of claim 1, wherein the object section and the common parameter section are in a storage medium.

3. The method of claim 1, wherein each graphic object corresponds to a menu object.

4. The method of claim 3, wherein the at least one common parameter comprises width or height setting corresponding to the graphic objects.

5. The method of claim 3, wherein the at least one common parameter comprises a background color setting corresponding to the graphic objects.

6. The method of claim 3, wherein the at least one common parameter comprises a foreground color setting corresponding to the graphic objects.

7. An image processing device for processing a plurality of graphic objects, each graphic object having at least one common parameter and at least one object data, the image processing device comprising:

a common parameter section for storing the at least one common parameter corresponding to the graphic objects, wherein the at least one common parameter is shared by the graphic objects;

an object section for storing the at least one object data of respective graphic objects;

a data processing unit coupled to the common parameter section and the object section for accessing and processing the at least one common parameter and the at least one object data;

a control unit coupled to the data processing unit for adjusting characteristics of the graphic objects according to the at least one common parameter, the at least one object data, or both; and a format converter coupled to the data processing unit for converting data format of the graphic objects.

8. The image processing device of claim 7, further comprising:

a color filter coupled to the format converter for filtering out a specific color of the graphic objects according to a transparency color setting recorded in the common parameter section.

9. The image processing device of claim 8, wherein the common parameter comprises a width or height setting corresponding to the graphic objects.

10. The image processing device of claim 8, wherein the common parameter comprises a background color setting corresponding to the graphic objects.

11. The image processing device of claim 8, wherein the common parameter comprises a foreground color setting corresponding to the graphic objects.

12. The image processing device of claim 7, wherein each graphic object corresponds to a menu object.

13. The image processing device of claim 7, wherein the common parameter comprises a transparency color setting corresponding to the graphic objects.

14. The image processing device of claim 7, wherein the common parameter comprises a data format corresponding to the graphic objects.

15. The image processing device of claim 7 is utilized in a digital television.

16. The image processing device of claim 7, further comprising:

a following stage, coupled to the format converter, wherein the format converter converts the data format of the graphic objects to a specific data format that the following stage is configured to process.

17. An image processing method for processing a plurality of graphic objects to be displayed on a display device, the method comprising:

for each of the graphic objects, storing at least one object data;

for all of the graphic objects, storing at least one common parameter including information of transparency color setting and data format;

processing a first graphic object of the plurality of graphic objects according to the common parameter and the stored object data corresponding to the first graphic object; and processing a second graphic object of the plurality of graphic objects according to the common parameter and the stored object data corresponding to the second graphic object displaying on a display device the plurality of graphic objects.

18. A method for recording a plurality of graphic objects, each graphic object having at least one common parameter and at least one object data, the method comprising:

recording the at least one common parameter corresponding to the plurality of graphic objects in a common parameter section, wherein the at least one common parameter comprises a data format corresponding to a color model relating to the graphic objects; and respectively recording the at least one object data of the plurality of graphic objects in corresponding object sections;

wherein the at least one common parameter and the at least one object data of each graphic object are utilized to describe characteristics of the graphic object.

19. The method of claim 18, wherein the object section and the common parameter section are in a storage medium.

20. The method of claim 18, wherein each graphic object corresponds to a menu object.

21. The method of claim 20, wherein the at least one common parameter comprises width or height setting corresponding to the graphic objects.

22. The method of claim 20, wherein the at least one common parameter comprises a background color setting corresponding to the graphic objects.

23. The method of claim 20, wherein the at least one common parameter comprises a foreground color setting corresponding to the graphic objects.

* * * * *